United States Patent
Ichikawa et al.

(10) Patent No.: US 7,939,969 B2
(45) Date of Patent: May 10, 2011

(54) POWER SUPPLY SYSTEM, VEHICLE WITH THE SAME, TEMPERATURE INCREASE CONTROL METHOD FOR POWER STORAGE DEVICE AND COMPUTER-READABLE RECORDING MEDIUM BEARING PROGRAM CAUSING COMPUTER TO EXECUTE TEMPERATURE INCREASE CONTROL OF POWER STORAGE DEVICE

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 203 days.

(21) Appl. No.: 12/308,228

(22) PCT Filed: Jun. 14, 2007

(86) PCT No.: PCT/JP2007/062476
§ 371 (c)(1),
(2), (4) Date: Dec. 10, 2008

(87) PCT Pub. No.: WO2008/010382
PCT Pub. Date: Jan. 24, 2008

(65) Prior Publication Data
US 2009/0289497 A1    Nov. 26, 2009

(30) Foreign Application Priority Data

Jul. 18, 2006 (JP) ................................. 2006-195449

(51) Int. Cl.
*H02J 1/10* (2006.01)

(52) U.S. Cl. ........................................................ 307/82
(58) Field of Classification Search .................... 307/82, 307/85, 86; 713/320, 323
See application file for complete search history.

(56) References Cited

U.S. PATENT DOCUMENTS

| | | | |
|---|---|---|---|
| 5,642,270 A | 6/1997 | Green et al. | |
| 6,512,350 B1 * | 1/2003 | Bernard et al. | 320/150 |
| 6,948,078 B2 * | 9/2005 | Odaohhara | 713/300 |
| 6,985,799 B2 * | 1/2006 | Zalesski et al. | 700/286 |
| 7,064,994 B1 * | 6/2006 | Wu | 365/211 |
| 2003/0107352 A1 | 6/2003 | Downer et al. | |

FOREIGN PATENT DOCUMENTS

DE    195 42 125 A1    5/1996

(Continued)

OTHER PUBLICATIONS

Feb. 18, 2010 Office Action issued in Russian Patent Application No. 2009105490/09(007364) (with translation).

*Primary Examiner* — Albert W Paladini
(74) *Attorney, Agent, or Firm* — Oliff & Berridge, PLC

(57) ABSTRACT

A first voltage control unit includes a first PI control unit, a first switching unit and a first subtraction unit. The first subtraction unit subtracts an output of the first switching unit from (a voltage value)/(a target voltage) that is a voltage feedforward compensation term. Similarly, a second voltage control unit includes a second PI control unit, a second switching unit and a second subtraction unit. A switching control unit control first and second switching units during temperature increase control to operate the PI control unit for the voltage control unit on a discharge side and to cut off an output of the PI control unit for the voltage control unit on a charge side.

8 Claims, 12 Drawing Sheets

FOREIGN PATENT DOCUMENTS

| | | |
|---|---|---|
| FR | 2 452 814 A1 | 10/1980 |
| GB | 2 050 089 A | 12/1980 |
| JP | A-2003-32901 | 1/2003 |
| JP | A-2003-209969 | 7/2003 |
| JP | A-2003-274565 | 9/2003 |
| JP | A-2003-324989 | 11/2003 |
| JP | A-2005-332777 | 12/2005 |
| RU | 2 144 869 C1 | 1/2000 |
| WO | WO 2006/014307 A1 | 2/2006 |

* cited by examiner

POWER SUPPLY SYSTEM, VEHICLE WITH THE SAME, TEMPERATURE INCREASE CONTROL METHOD FOR POWER STORAGE DEVICE AND COMPUTER-READABLE RECORDING MEDIUM BEARING PROGRAM CAUSING COMPUTER TO EXECUTE TEMPERATURE INCREASE CONTROL OF POWER STORAGE DEVICE

TECHNICAL FIELD

The invention relates to a control technique for increasing temperature of a power storage device included in a power supply system.

BACKGROUND ART

In recent years, vehicles such as a hybrid vehicle and an electric vehicle that are equipped with an electric motor as a power source have been improved to increase a capacity of a power storage unit for improving drive performance such as acceleration performance and a continuous travel distance. A structure having a plurality of power storage devices has been proposed as means for increasing the capacity of the power storage unit.

Japanese Patent Laying-Open No. 2003-209969 has disclosed a power supply control system provided with a plurality of power supply stages. This power supply control system includes a plurality of power supply stages that are connected in parallel together and supply a DC power to at least one inverter. Each power supply 6stage includes a battery and a boost/buck DC-DC converter.

In this power supply control system, the plurality of power supply stages are controlled to maintain an output voltage for the inverter by uniformly charging and discharging a plurality of batteries that are included in respective power supply stages.

Generally, in a power storage device such as a secondary battery and a capacitor, a capacity lowers with lowering of a temperature so that a charge/discharge property deteriorates with it. In the hybrid vehicle and others, therefore, the temperature of the power storage device must be rapidly increased when the temperature of the power storage device is low after a vehicle system started. Particular, in the system having a plurality of power storage devices such as the power supply control system disclosed in aforementioned Japanese Patent Laying-Open No. 2003-209969, it is necessary to increase the temperature of the power storage device before the start of driving for sufficiently bringing out merits of the large capacity of power storage unit.

However, aforementioned Japanese Patent Laying-Open No. 2003-209969 has merely disclosed that the power storage device is operated to charge and discharge uniformly the plurality of batteries included in respective power supply stages, and has not particularly discussed a method for rapidly increasing the temperature of the plurality of power storage devices at a low temperature.

DISCLOSURE OF THE INVENTION

An object of the invention is to provide a power supply system having a power storage unit of which temperature can be rapidly increased as well as a vehicle provided with the power supply system.

Another object of the invention is to provide a temperature increase control method for rapidly increasing temperature of a power storage unit.

Further another object of the invention is to provide a computer-readable recording medium that bears a program for causing a computer to perform temperature increase control for rapidly increasing temperature of power storage unit.

According to the invention, a power supply system is capable of supplying an electric power to a load device, and includes first and second power storage devices allowing charging and discharging, a power line, first and second converters, a control device and a first voltage sensor. The power line is configured to be capable of supplying and receiving an electric power between the power supply system and the load device. The first converter is arranged between the first power storage device and the power line, and performs voltage conversion between the first power storage device and the power line. The second converter is arranged between the second power storage device and the power line, and performs voltage conversion between the second power storage device and the power line. The control device controls the first and second converters. The first voltage sensor senses a voltage on the power line. During temperature increase control performed for increasing temperature of at least one of the first and second power storage devices by supplying and receiving an electric power between the first and second power storage devices via the first and second converters and the power line, the control device controls one of the first and second converters based on a result of an operation in voltage feedback control using a deviation between a target voltage on the power line and a voltage sensed by the first voltage sensor, and controls the other converter based on a result of an operation in a voltage feedforward control not using the deviation.

Preferably, the control device includes first and second control units, and a switching control unit. The first and second control units control the first and second converters, respectively. The switching control unit produces a switching instruction allowing switching between the voltage feedback control and the voltage feedforward control, and provides the switching instruction to each of the first and second control units, during the temperature increase control. Each of the first and second control units includes a voltage feedback compensation unit, a voltage feedforward compensation unit, and a switching unit. The voltage feedback compensation unit is configured to be capable of performing the voltage feedback control of the corresponding converter. The voltage feedforward compensation unit is configured to be capable of performing the voltage feedforward control of the corresponding converter. The switching unit is configured to be capable of selectively activating and deactivating a function of the voltage feedback compensation unit according to the switching instruction. The switching control unit produces, during the temperature increase control, the switching instruction to activate the function of the voltage feedback compensation unit of one of the first and second control units, and to deactivate the function of the voltage feedback compensation unit of the other control unit.

Further preferably, the power supply system further includes second and third voltage sensors. The second and third voltage sensors sense the voltages of the first and second power storage devices, respectively. The voltage feedforward compensation unit uses, as a compensation amount, a ratio between the voltage of the corresponding power storage device sensed by the second or third voltage sensor and the target voltage of the power line.

Preferably, the control device operates, during the temperature increase control, to control the converter corresponding to the power storage device on the discharge side based on a result of the operation in the voltage feedback control, and to control the converter corresponding to the power storage device on the charge side based on a result of the operation in the voltage feedforward control.

Further preferably, each of the first and second converters includes a two-quadrant chopper circuit. The control device controls, during the temperature increase control, the converter corresponding to the power storage device on the charge side to turn on a switching element forming an upper arm of the converter corresponding to the power storage device on the charge side.

Also, according to the invention, a vehicle includes one of the power supply systems described above; and a drive power generating unit receiving an electric power from the power supply system and generating a drive power of the vehicle.

Further, the invention provides a temperature increase control method for a power storage device in a power supply system capable of supplying an electric power to a load device. The power supply system includes first and second power storage devices allowing charging and discharging, a power line, first and second converters and a voltage sensor. The power line is capable of supplying and receiving an electric power between the power supply system and the load device. The first converter is arranged between the first power storage device and the power line, and performs voltage conversion between the first power storage device and the power line. The second converter is arranged between the second power storage device and the power line, and performs voltage conversion between the second power storage device and the power line. The voltage sensor senses a voltage on the power line. The temperature increase control method includes a first step of controlling one of the first and second converters based on a result of an operation in voltage feedback control using a deviation between a target voltage on the power line and a voltage sensed by the first voltage sensor, during temperature increase control performed for increasing temperature of at least one of the first and second power storage devices by supplying and receiving an electric power between the first and second power storage devices via the first and second converters and the power line; and a second step of controlling the other converter based on a result of an operation in a voltage feedforward control not using the deviation.

Further, the invention provides a computer-readable recording medium bearing a program for causing a computer to execute temperature increase control of a power storage device in a power supply system capable of supplying an electric power to a load device. The power supply system includes first and second power storage devices allowing charging and discharging, a power line, first and second converters and a voltage sensor. The power line is configured to be capable of supplying and receiving an electric power between the power supply system and the load device. The first converter is arranged between the first power storage device and the power line, and performs voltage conversion between the first power storage device and the power line. The second converter is arranged between the second power storage device and the power line, and performs voltage conversion between the second power storage device and the power line. The voltage sensor senses a voltage on the power line. The recording medium bears the program for causing the computer to execute a first step of controlling one of the first and second converters based on a result of an operation in voltage feedback control using a deviation between a target voltage on the power line and a voltage sensed by the first voltage sensor, during temperature increase control performed for increasing temperature of at least one of the first and second power storage devices by supplying and receiving an electric power between the first and second power storage devices via the first and second converters and the power line; and a second step of controlling the other converter based on a result of an operation in a voltage feedforward control not using the deviation.

In the invention, the first converter is arranged between the first power storage device and the power line, and the second converter is arranged between the second power storage device and the power line. During the temperature increase control performed for increasing temperature of at least one of the first and second power storage devices, the control device controls one of the first and second converters by the voltage feedback control, and controls the other converter by the voltage feedforward control. Therefore, the electric power can be transferred between the first and second power storage devices via the first and second converters as well as the power line while preventing interference between the two voltage control systems that control the first and second converters, respectively.

According to the invention, therefore, the temperature of the first and second power storage devices can be rapidly increased. Consequently, a desired drive performance can be ensured at and after the start of drive of the vehicle even when it was at a low temperature.

BEST MODES FOR CARRYING OUT THE INVENTION

Embodiments of the invention will be described below with reference to the drawings. In the figures, the same or corresponding components bear the same reference numbers, and description thereof is not repeated.

First Embodiment

Figure 1:
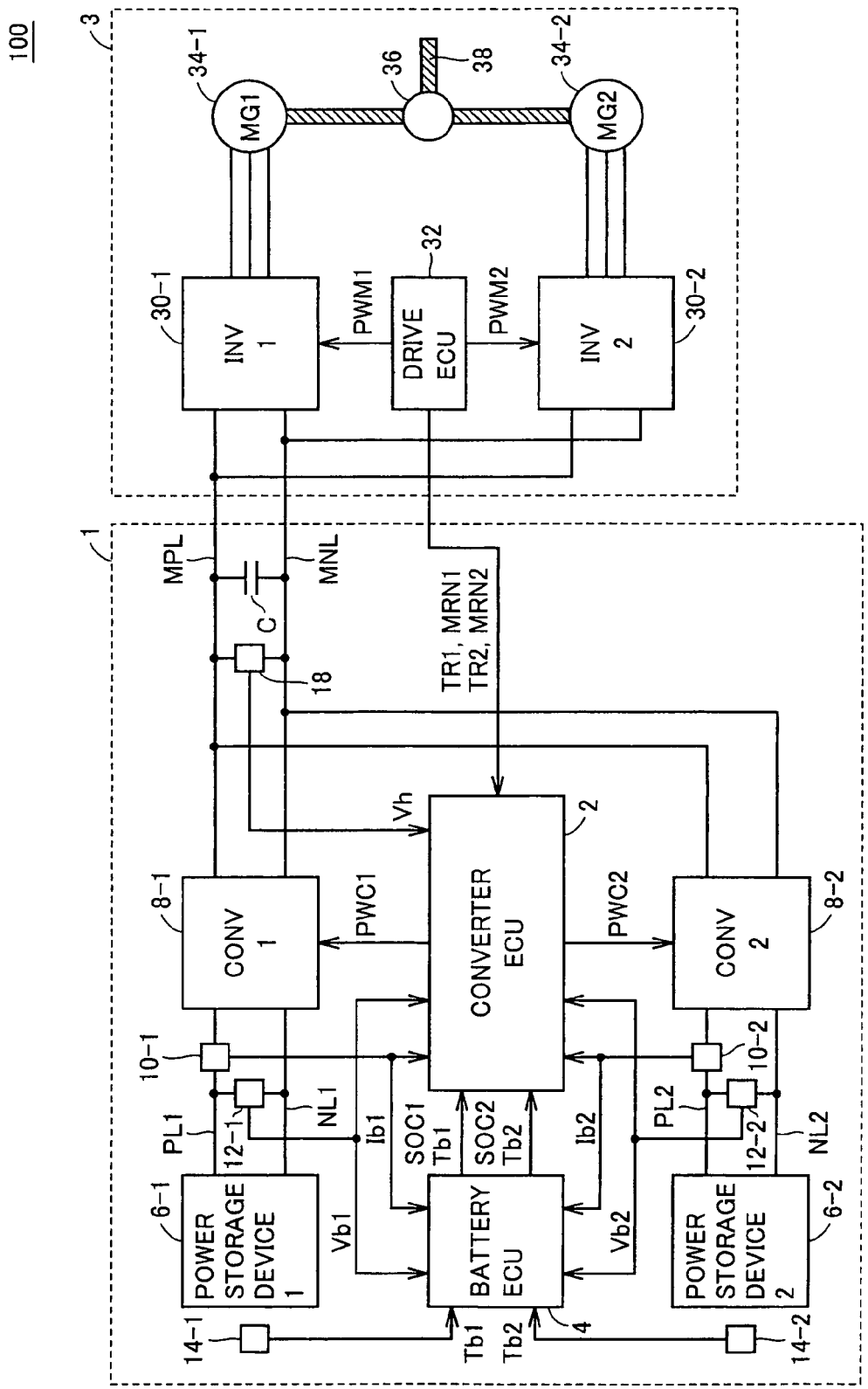
FIG. 1 is an overall block diagram of a vehicle according to a first embodiment of the invention.

FIG. 1 is an overall block diagram showing a vehicle of a first embodiment of the invention. Referring to FIG. 1, a vehicle 100 includes a power supply system 1 and a drive power generating unit 3. Drive power generating unit 3 includes inverters 30-1 and 30-2, motor generators 34-1 and 34-2, a power transmission mechanism 36, a drive shaft 38 and a drive ECU (Electronic Control Unit) 32.

Inverters 30-1 and 30-2 are connected in parallel to a main positive bus line MPL and a main negative bus line MNL. Inverters 30-1 and 30-2 convert the drive powers (DC powers) supplied from power supply system 1 into AC powers, and provide them to motor generators 34-1 and 34-2, respectively. Inverters 30-1 and 30-2 convert the AC powers generated by motor generators 34-1 and 34-2 into DC powers, and provide them as regenerative powers to power supply system 1.

Each of inverters 30-1 and 30-2 is formed of, e.g., a bridge circuit including three-phase switching elements. Inverters 30-1 and 30-2 perform switching operations according to drive signals PWM1 and PWM2 provided from drive ECU 32, and thereby drive the corresponding motor generators, respectively.

Motor generators 34-1 and 34-2 receive the AC powers from inverters 30-1 and 30-2, and thereby generate the rotational drive powers, respectively. Motor generators 34-1 and 34-2 receive externally supplied rotational power, and thereby generate the AC powers. For example, each of motor generators 34-1 and 34-2 is formed of a three-phase AC rotary motor provided with a rotor having an embedded permanent magnet. Motor generators 34-1 and 34-2 are coupled to power transmission mechanism 36 for transmitting the rotational drive power to wheels (not shown) via drive shaft 38 coupled to power transmission mechanism 36.

In the case where drive power generating unit 3 is employed in the hybrid vehicle, motor generators 34-1 and 34-2 are also coupled to an engine (not shown) via power transmission mechanism 36 or drive shaft 38. Drive ECU 32 executes the control to achieve an optimum ratio between the drive power generated by the engine and the drive powers generated by motor generators 34-1 and 34-2. In this structure employed in the hybrid vehicle, one of motor generators 34-1 and 34-2 may be operated exclusively as an electric motor, and the other motor generator may be operated exclusively as a power generator.

Drive ECU 32 calculates torque target values TR1 and TR2 as well as revolution speed target values MRN1 and MRN2 of motor generators 34-1 and 34-2, based on signals transmitted from various sensors (not shown), running conditions and an accelerator press-down degree and the like. Also, drive ECU 32 produces drive signals PWM1 and PWM2 to control inverters 30-1 and 30-2 such that the generated torques and revolution speeds of motor generators 34-1 and 34-2 may attain torque target values TR1 and TR2 and revolution speed target values MRN1 and MRN2, respectively. Further, drive ECU 32 provides torque target values TR1 and TR2 as well as revolution speed target values MRN1 and MRN2 thus calculated to a converter ECU 2 (to be described later) of power supply system 1.

Power supply system 1 includes power storage devices 6-1 and 6-2, converters 8-1 and 8-2, a smoothing capacitor C, converter ECU 2, a battery ECU 4, current sensors 10-1 and 10-2, voltage sensors 12-1, 12-2 and 18, and temperature sensors 14-1 and 14-2.

Power storage devices 6-1 and 6-2 are chargeable and dischargeable DC power supplies, and each are formed of a secondary battery such as a nickel hydrogen battery or a lithium ion battery. Power storage device 6-1 is connected to converter 8-1 via positive line PL1 and negative line NL1. Power storage device 6-2 is connected to converter 8-2 via positive line LP2 and negative line NL2. Power storage devices 6-1 and 6-2 may be formed of electrical double layer capacitors.

Converter 8-1 is arranged between power storage device 6-1 and the pair of main positive bus line MPL and main negative bus line MNL, and performs the voltage conversion between power storage device 6-1 and the pair of main positive bus line MPL and main negative bus line MNL based on a drive signal PWC1 from converter ECU 2. Converter 8-2 is arranged between power storage device 6-2 and the pair of main positive bus line MPL and main negative bus line MNL, and performs the voltage conversion between power storage device 6-2 and the pair of main positive bus line MPL and main negative bus line MNL based on a drive signal PWC2 from converter ECU 2.

Smoothing capacitor C is connected between main positive bus line MPL and main negative bus line MNL, and reduces power variation components included in main positive bus line MPL and main negative bus line MNL. Voltage sensor 18 senses a voltage Vh across main positive bus line MPL and main negative bus line MNL, and provides a result of the sensing to converter ECU 2.

Current sensors 10-1 and 10-2 sense currents of values Ib1 and Ib2 provided to/from power storage devices 6-1 and 6-2, respectively, and each provide a result of the sensing to converter ECU 2 and battery ECU 4. Current sensors 10-1 and 10-2 sense the currents (discharge currents) supplied from the corresponding power storage devices as positive values, and sense the currents (charge currents) supplied to the corresponding power storage devices as negative values. In the structure shown in the figure, current sensors 10-1 and 10-2 sense the current values of positive lines PL1 and PL2, respectively. However, current sensors 10-1 and 10-2 may sense the currents of negative lines NL1 and NL2, respectively.

Voltage sensors 12-1 and 12-2 sense voltage values Vb1 and Vb2 of power storage devices 6-1 and 6-2, respectively, and each provide a result of the sensing to converter ECU 2 and battery ECU 4. Temperature sensors 14-1 and 14-2 sense internal temperatures Tb1 and Tb2 of power storage devices 6-1 and 6-2, respectively, and provide results of the sensing to battery ECU 4.

Battery ECU 4 calculates a state quantity SOC1 that represents an SOC (State Of Charge) of power storage device 6-1, based on current value Ib1 from current sensor 10-1, voltage value Vb1 from voltage sensor 12-1 and temperature Tb1 from temperature sensor 14-1, and provides state quantity SOC1 thus calculated to converter ECU 2 together with temperature Tb1.

Battery ECU 4 calculates a state quantity SOC2 that represents an SOC of power storage device 6-2, based on current value Ib2 from current sensor 10-2, voltage value Vb2 from voltage sensor 12-2 and temperature Tb2 from temperature sensor 14-2, and provides state quantity SOC2 thus calculated to converter ECU 2 together with temperature Tb2. Various known methods may be employed for calculating state quantities SOC1 and SOC2.

Converter ECU 2 produces drive signals PWC1 and PWC2 for driving converters 8-1 and 8-2, based on various sensed values provided from current sensors 10-1 and 10-2, voltage sensors 12-1 and 12-2, and voltage sensor 18 as well as temperatures Tb1 and Tb2 and state quantities SOC1 and SOC2 provided from battery ECU 4, and torque target values TR1 and TR2 and revolution speed target values MRN1 and MRN2 provided from drive ECU 32. Converter ECU 2 provides drive signals PWC1 and PWC2 thus produced to converters 8-1 and 8-2 for controlling converters 8-1 and 8-2, respectively. A structure of converter ECU 2 will be described later in detail.

Figure 2:
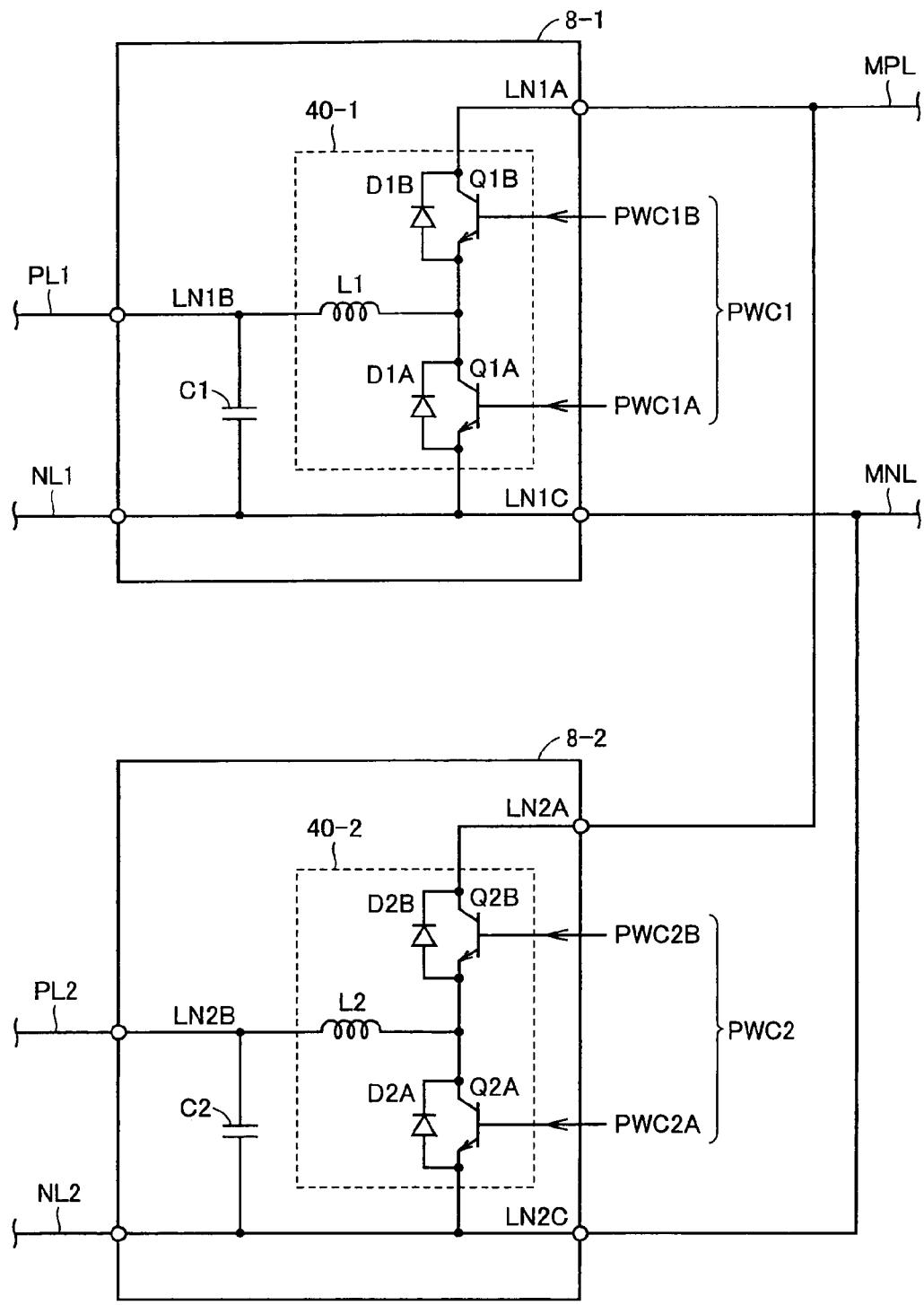
FIG. 2 shows schematic structures of converters shown in FIG. 1.

FIG. 2 shows schematic structures of converters 8-1 and 8-2 shown in FIG. 1. A structure and an operation of converter 8-2 are substantially the same as those of converter 8-1, and therefore the following description will be given on the structure and operation of converter 8-1. Referring to FIG. 2, converter 8-1 includes a chopper circuit 40-1, a positive bus line LN1A, a negative bus line LN1C, an interconnection LN1B and a smoothing capacitor C1. Chopper circuit 40-1 includes transistors Q1A and Q1B, diodes D1A and D1B, and an inductor L1.

One of ends of positive bus line LN1A is connected to a collector of transistor Q1B, and the other is connected to main positive bus line MPL. One of ends of negative bus line LN1C is connected to negative line NL1, and the other is connected to main negative bus line MNL.

Transistors Q1A and Q1B are connected in series between negative bus line LN1C and positive bus line LN1A. Specifically, an emitter of transistor Q1A is connected to negative bus line LN1C, and a collector of transistor Q1B is connected to positive bus line LN1A. Diodes D1A and D1B are connected in antiparallel to transistors Q1A and Q1B, respectively. Inductor L1 is connected to a node between transistors Q1A and Q1B.

One end of interconnection LN1B is connected to positive line PL1, and the other end is connected to inductor L1. Smoothing capacitor C1 is connected between interconnection LN1B and negative bus line LN1C, and reduces AC components included in the DC voltage between interconnection LN1B and negative bus line LN1C.

In response to drive signal PWC1 from converter ECU 2 (not shown), chopper circuit 40-1 boosts the DC power (drive power) received from positive and negative lines PL1 and NL1 during the discharge operation of power storage device 6-1, and steps down the DC power (regenerative power) received from main positive bus line MPL and main negative bus line MNL during the charge operation of power storage device 6-1.

Voltage converting operations (boosting and stepping down operations) of converter 8-1 will now be described. In the boosting operation, converter ECU 2 keeps transistor Q1B off, and turns on/off transistor Q1A with a predetermined duty ratio. During the on period of transistor Q1A, a discharge current flows from power storage device 6-1 to main positive bus line MPL via interconnection LN1B, inductor L1, diode D1B and positive bus line LN1A. Simultaneously, a pump current flows from power storage device 6-1 via interconnection LN1B, inductor L1, transistor Q1A and negative bus line LN1C. Inductor L1 accumulates an electromagnetic energy by this pump current. When transistor Q1A changes from the on state to the offstate, inductor L1 superimposes the accumulated electromagnetic energy on the discharge current. Consequently, an average voltage of the DC power supplied from converter 8-1 to main positive bus line MPL and main negative bus line MNL is boosted by a magnitude corresponding to the electromagnetic energy accumulated in inductor L1 according to the duty ratio.

In the stepping down operation, converter ECU 2 turns on/off transistor Q1B with a predetermined duty ratio, and keeps transistor Q1A off During the off period of transistor Q1B, the charge current flows from main positive bus line MPL to power storage device 6-1 via positive bus line LN1A, transistor Q1B, inductor L1 and interconnection LN1B. When transistor Q1B changes from the on state to the off state, inductor L1 generates a magnetic flux that may prevent changes in current so that the charge current continues the flowing via diode D1A, inductor L1 and interconnection LN1B. From the viewpoint of the electric energy, main positive bus line MPL and main negative bus line MNL supply the DC power only during the on period of transistor Q1B, and therefore the average voltage of the DC power supplied from converter 8-1 to power storage device 6-1 takes a value obtained by multiplying the DC voltage between main positive bus line MPL and main negative bus line MNL by the duty ratio, assuming that the charge current is kept constant (i.e., inductor L1 has a sufficiently large inductance).

For controlling the voltage converting operation of converter 8-1, converter ECU 2 produces drive signal PWC1 formed of a drive signal PWC1A for controlling on/off of transistor Q1A and a drive signal PWC1B for controlling on/off of transistor Q1B.

Figure 3:
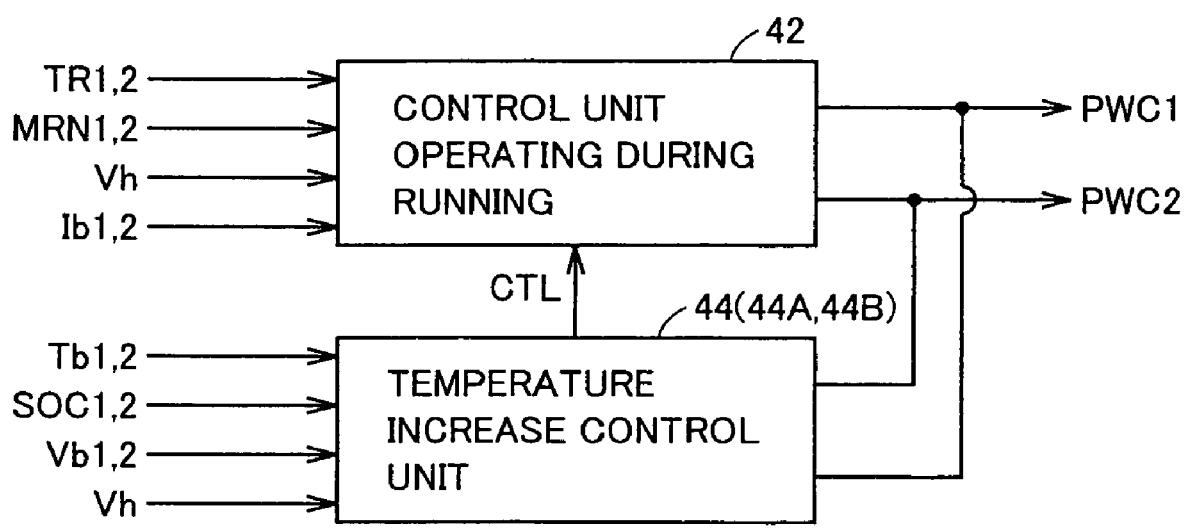
FIG. 3 is a functional block diagram of a converter ECU shown in FIG. 1.

FIG. 3 is a functional block diagram of converter ECU 2 shown in FIG. 1. Referring to FIG. 3, converter ECU 2 includes a control unit 42 operating during running and a temperature increase control unit 44.

Control unit 42 operating during running receives torque target values TR1 and TR2 as well as revolution speed target values MRN1 and MRN2 of motor generators 34-1 and 34-2 from drive ECU 32. Control unit 42 operating during running receives voltage value Vh from voltage sensor 18, and also receives current values Ib1 and Ib2 from current sensors 10-1 and 10-2, respectively.

When a control signal CTL from control unit 42 operating during running is inactive, i.e., when temperature increase control unit 44 is not executing the temperature increase control, control unit 42 operating during running produces, based on the above signals, drive signals PWC1 and PWC2 for driving converters 8-1 and 8-2, and provides drive signals PWC1 and PWC2 thus produced to converters 8-1 and 8-2, respectively. When control signal CTL is active, i.e., when temperature increase control unit 44 is executing the temperature increase control, control unit 42 operating during running stops the production of drive signals PWC1 and PWC2.

Temperature increase control unit 44 receives temperatures Tb1 and Tb2 as well as state quantities SOC1 and SOC2 from battery ECU 4. Temperature increase control unit 44 also receives voltage values Vb1 and Vb2 from voltage sensors 12-1 and 12-2, respectively, and also receives voltage value Vh from voltage sensor 18. Temperature increase control unit 44 executes the temperature increase control for increasing temperature of power storage devices 6-1 and 6-2 by supplying or receiving the electric powers between power storage devices 6-1 and 6-2 via converters 8-1 and 8-2 as well as main positive bus line MPL and main negative bus line MNL when one of temperatures Tb1 and Tb2 indicating power storage devices 6-1 and 6-2 is lower than a specified value.

More specifically, when one of temperatures Tb1 and Tb2 is lower than the specified value, temperature increase control unit 44 produces drive signals PWC1 and PWC2 by the method to be described later based on the above respective signals. Temperature increase control unit 44 provides drive signals PWC1 and PWC2 thus produced to converters 8-1 and 8-2, respectively, and activates control signal CTL provided to control unit 42 operating during running.

Figure 4:
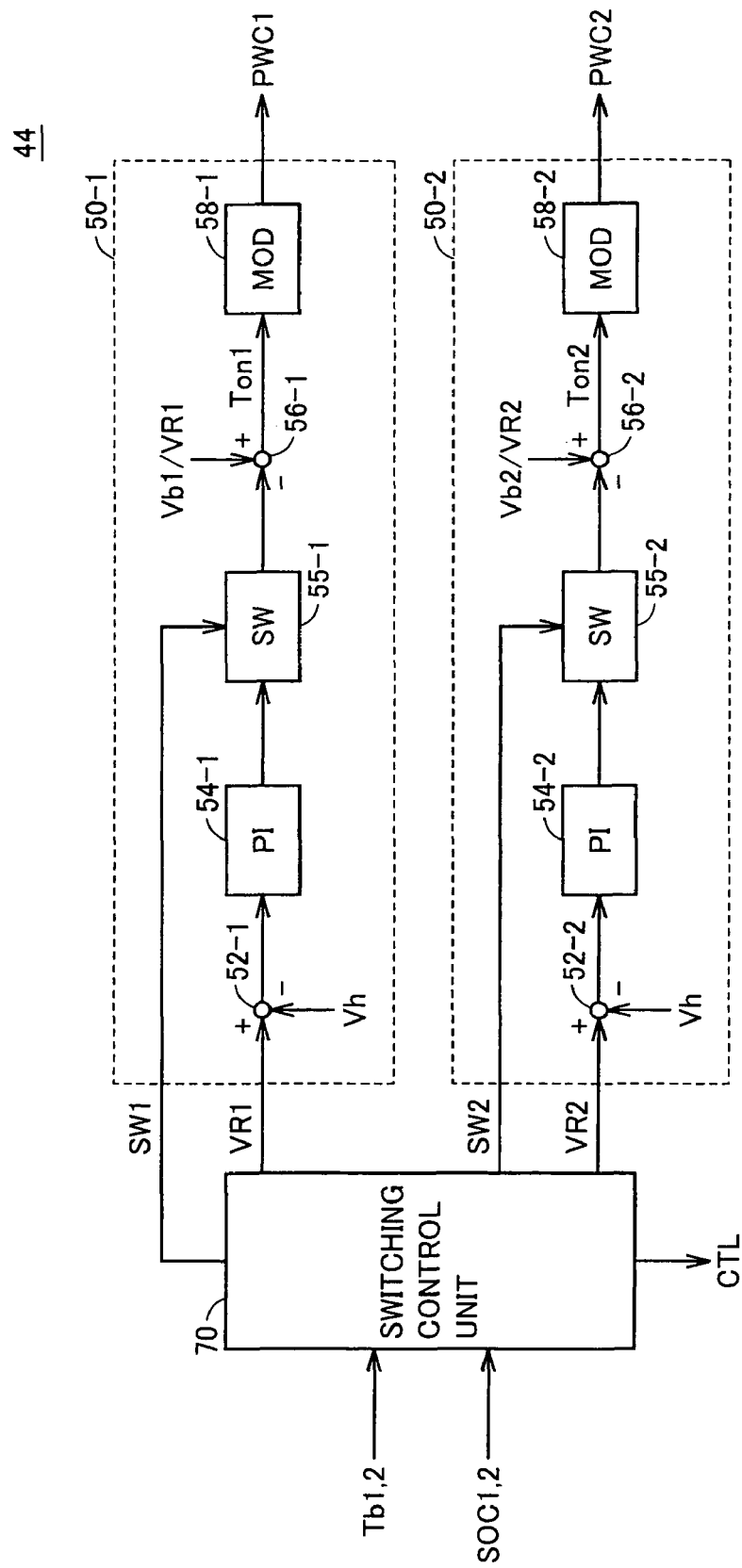
FIG. 4 is a functional block diagram specifically showing a temperature increase control unit in FIG. 3.

FIG. 4 is a specific functional block diagram of temperature increase control unit 44 shown in FIG. 3. Referring to FIG. 4, temperature increase control unit 44 includes voltage control units 50-1 and 50-2 as well as a switching control unit 70.

Voltage control unit 50-1 includes subtraction units 52-1 and 56-1, a PI control unit 54-1, a switching unit 55-1 and a modulation unit 58-1. Subtraction unit 52-1 subtracts voltage value Vh from a target voltage VR1 provided from switching control unit 70, and provides a result of this operation to PI control unit 54-1. PI control unit 54-1 performs a proportional-plus-integral operation using, as an input, a deviation between target voltage VR1 and voltage value Vh, and provides a result of this operation to switching unit 55-1. Thus, PI control unit 54-1 is a voltage feedback (which may also be referred to as a "voltage FB" hereinafter) compensation term using the deviation between target voltage VR1 and voltage value Vh.

When a switching signal SW1 provided from switching control unit 70 is active, switching unit 55-1 provides a result of the operation of PI control unit 54-1 to subtraction unit 56-1. When switching signal SW1 is inactive, switching unit 55-1 provides a value of "0" to subtraction unit 56-1 instead of the result of operation of PI control unit 54-1. Thus, when switching signal SW1 is active, switching unit 55-1 activates the voltage FB control to be performed by PI control unit 54-1. When switching signal SW1 is inactive, it deactivates the voltage FB control to be performed by PI control unit 54-1.

Subtraction unit 56-1 subtracts the output of switching unit 55-1 from an inverse number of a theoretical boost ratio of converter 8-1 represented as (voltage value Vb1)/(target voltage VR1), and provides a result of this operation to modulation unit 58-1 as a duty instruction Ton1. Thus, the input term (voltage value Vb1)/(target voltage VR1) in this subtraction unit 56-1 is a voltage feedforward (which may also be referred to as a "voltage FF" hereinafter) compensation term based on a theoretical boost ratio of converter 8-1.

Modulation unit 58-1 produces drive signal PWC1 based on duty instruction Ton1 and a carrier wave produced by an oscillation unit (not shown), and provides drive signal PWC1 thus produced to transistors Q1A and Q1B of converter 8-1.

Voltage control unit 50-2 includes subtraction units 52-2 and 56-2, a PI control unit 54-2, a switching unit 55-2 and a modulation unit 58-2. Voltage control unit 50-2 has substantially the same structure as voltage control unit 50-1. Thus, PI control unit 54-2 is a voltage FB compensation term using a deviation between a target voltage VR2 and voltage value Vh, and the input term (voltage value Vb2)/(target voltage VR2) of subtraction unit 56-2 is a voltage FF compensation term based on the theoretical boost ratio of converter 8-2. When a switching signal SW2 provided from switching control unit 70 is active, switching unit 55-2 activates the function of voltage FB control to be performed by PI control unit 54-2. When switching signal SW2 is inactive, it deactivates the function of voltage FB control to be performed by PI control unit 54-2.

Switching control unit 70 determines, based on temperatures Tb1 and Tb2, whether the temperature increase control of power storage devices 6-1 and 6-2 is to be executed or not, and activates control signal CTL to be provided to control unit 42 operating during running shown in FIG. 3 when the temperature increase control is to be executed. In the temperature increase control, switching control unit 70 produces target voltages VR1 and VR2 of converters 8-1 and 8-2 as well as switching signal SW1 and SW2 based on temperatures Tb1 and Tb2 and state quantities SOC1 and SOC2, respectively, provides target voltage VR1 and switching signal SW1 to voltage control unit 50-1 and provides target voltage VR2 and switching signal SW2 to voltage control unit 50-2.

Figure 5:
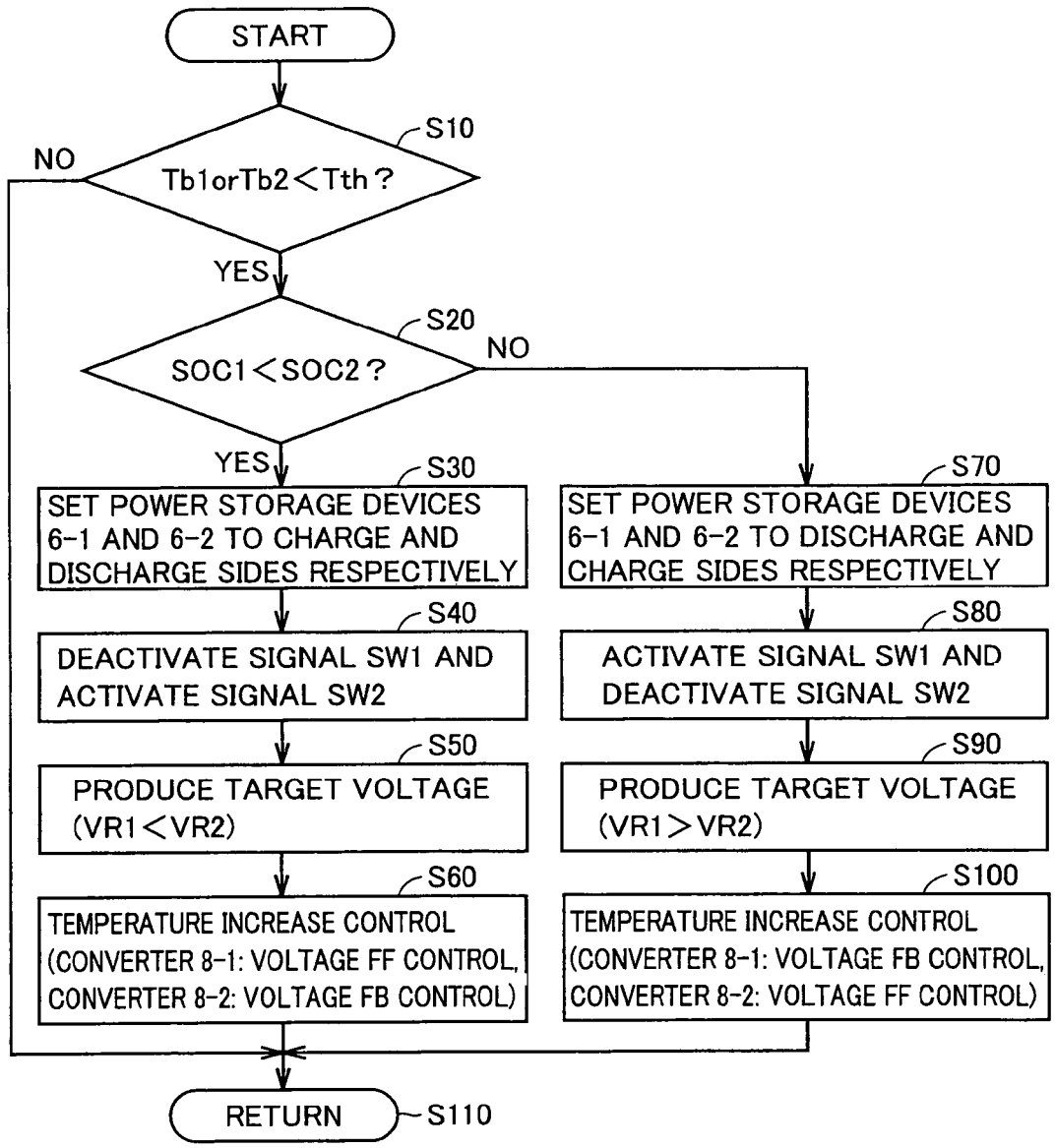
FIG. 5 is a flowchart of the temperature increase control by the temperature increase control unit shown in FIG. 4.

FIG. 5 is a flowchart of the temperature increase control by temperature increase control unit 44 shown in FIG. 4. The processing shown in this flowchart is called for execution from a main routine at predetermined time intervals or when predetermined conditions are satisfied (e.g., at the start of the system).

Referring to FIGS. 4 and 5, switching control unit 70 determines whether temperature Tb1 from temperature sensor 14-1 or temperature Tb2 from temperature sensor 14-2 is lower than a preset threshold temperature Tth (e.g., −10° C.) or not (step S10). When switching control unit 70 determines that both temperatures Tb1 and Tb2 are equal to or higher than threshold temperature Tth (NO in step S10), it advances the processing to step S110, and deactivates control signal CTL provided to control unit 42 operating during running (FIG. 3).

When it is determined in step S10 that temperature Tb1 or Tb2 is lower than threshold temperature Tth (YES in step S10), switching control unit 70 activates control signal CTL to be provided to control unit 42 operating during running. Switching control unit 70 determines whether state quantity SOC1 is smaller than state quantity SOC2 or not (step S20).

When switching control unit 70 determines that state quantity SOC1 is smaller than state quantity SOC2 (YES in step S20), it sets power storage devices 6-1 and 6-2 on the charge side and the discharge side, respectively (step S30). Switching control unit 70 deactivates switching signal SW1 provided to switching unit 55-1 of voltage control unit 50-1, and activates switching signal SW2 provided to switching unit 55-2 of voltage control unit 50-2 (step S40).

Thereby, the voltage FB control function by PI control unit 54-1 is deactivated in voltage control unit 50-1 corresponding to power storage device 6-1 on the charge side, and the voltage FB control function by PI control unit 54-2 is activated in voltage control unit 50-2 corresponding to power storage device 6-2 on the discharge side. Thus, voltage control unit 50-1 provides a voltage FF control system based on the theoretical boost ratio, and voltage control unit 50-2 provides a voltage FB control system using PI control unit 54-2.

Then, switching control unit 70 produces target voltages VR1 and VR2 of respective converters 8-1 and 8-2 (step S50). Switching control unit 70 sets target voltage VR2 higher than target voltage VR1 so that the power may flow from power storage device 6-2 set on the discharge side to power storage device 6-1 set on the charge side.

When target voltages VR1 and VR2 are produced, voltage control unit 50-1 controls converter 8-1 by the voltage FF control based on target voltage VR1, and voltage control unit 50-2 controls converter 8-2 by the voltage FB control based on target voltage VR2. Thereby, the power flows from power storage device 6-2 via converter 8-2, main positive bus line MPL and main negative bus line MNL, and converter 8-1 to power storage device 6-1 so that the temperature increase control is performed on power storage devices 6-1 and 6-2 (step S60).

When it is determined in step S20 that state quantity SOC1 is equal to or higher than state quantity SOC2 (NO in step S20), switching control unit 70 sets power storage devices 6-1 and 6-2 on the discharge and charge sides, respectively (step S70). Switching control unit 70 activates switching signal SW1, and deactivates switching signal SW2 (step S80).

Thereby, the voltage FB control function by PI control unit 54-1 is activated in voltage control unit 50-1 corresponding to power storage device 6-1 on the discharge side, and the voltage FB control function by PI control unit 54-2 is deactivated in voltage control unit 50-2 corresponding to power storage device 6-2 on the charge side. Thus, voltage control unit 50-1 provides the voltage FB control system using PI control unit 54-1, and voltage control unit 50-2 provides the voltage FF control system based on the theoretical boost ratio.

Then, switching control unit 70 produces target voltages VR1 and VR2 (step S90). Switching control unit 70 sets target voltage VR1 higher than target voltage VR2 so that the power may flow from power storage device 6-1 set on the discharge side to power storage device 6-2 set on the charge side.

When target voltages VR1 and VR2 are produced, voltage control unit 50-1 controls converter 8-1 by the voltage FB control based on target voltage VR1, and voltage control unit 50-2 controls converter 8-2 by the voltage FF control based on target voltage VR2. Thereby, the power flows from power storage device 6-1 via converter 8-1, main positive bus line MPL and main negative bus line MNL, and converter 8-2 to power storage device 6-2, and the temperature increase control is performed on power storage devices 6-1 and 6-2 (step S100).

When the temperature increase control of power storage devices 6-1 and 6-2 is implemented as described above, one of voltage control units 50-1 and 50-2 controls the corresponding converter by the voltage FB control, and the other voltage control unit controls the corresponding converter by the voltage FF control. Therefore, the temperature increase control can be implemented while controlling the voltage of value Vh between main positive bus line MPL and main negative bus line MNL to attain the target voltage by the voltage control unit on the discharge side without causing the interference between voltage control units 50-1 and 50-2 that can control voltage value Vh.

Figure 6:
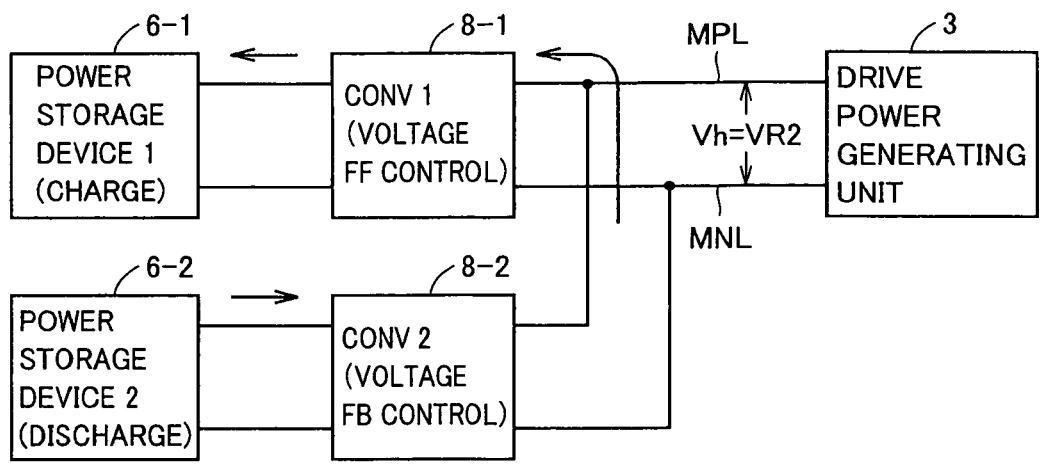
FIG. 6 is a first diagram showing a flow of an electric power during temperature increase control.

FIG. 6 is a first diagram showing a flow of the electric power during the temperature increase control. FIG. 6 shows the flow of the electric power in the state where power storage devices 6-1 and 6-2 are on the charge and discharge sides, respectively.

Referring to FIG. 6, converter 8-2 corresponding to power storage device 6-2 on the discharge side is controlled by the voltage FB control, and converter 8-1 corresponding to power storage device 6-1 on the charge side is controlled by the voltage FF control. Converter 8-2 supplies the power from power storage device 6-2 to main positive bus line MPL and main negative bus line MNL, and controls voltage value Vh between main positive bus line MPL and main negative bus line MNL to target voltage VR2.

Converter 8-1 is controlled based on the theoretical boost ratio represented by the ratio between target voltage VR1 and the voltage of power storage device 6-1 without performing the feedback of voltage value Vh. In this state, voltage value Vh that is set to target voltage VR2 by the control of converter 8-2 is higher than target voltage VR1 so that the current flows from main positive bus line MPL and main negative bus line MNL via converter 8-1 to power storage device 6-1.

Thereby, the power flows from power storage device 6-2 via converter 8-2, main positive bus line MPL and main negative bus line MNL, and converter 8-1 to power storage device 6-1. Thus, the charging and discharging take place in power storage devices 6-1 and 6-2 to increase temperature of power storage devices 6-1 and 6-2, respectively. Since voltage value Vh between main positive bus line MPL and main negative bus line MNL is set to target voltage VR2 by the control of converter 8-2, the temperature of power storage devices 6-1 and 6-2 can be increased while controlling voltage value Vh to fall within an appropriate range (lower than breakdown voltages of smoothing capacitor C not shown in FIG. 6 and drive power generating unit 3).

Figure 7:
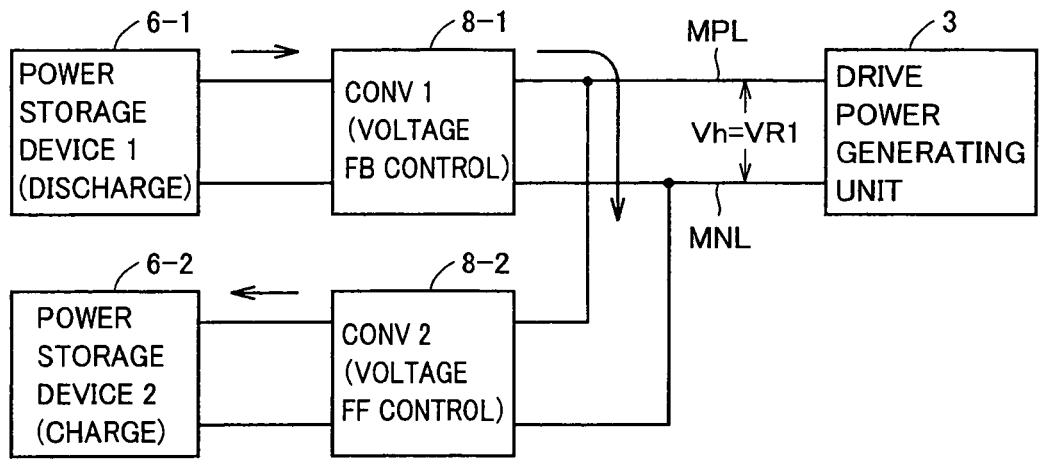
FIG. 7 is a second diagram showing the flow of the electric power during the temperature increase control.

FIG. 7 is a second diagram showing a flow of the electric power during the temperature increase control. FIG. 7 shows the flow of the electric power in the state where power storage devices 6-1 and 6-2 are on the discharge and charge sides, respectively.

Referring to FIG. 7, converter 8-1 corresponding to power storage device 6-1 on the discharge side is controlled by the voltage FB control, and converter 8-2 corresponding to power storage device 6-2 on the charge side is controlled by the voltage FF control. Target voltage VR1 of converter 8-1 is set higher than target voltage VR2 of converter 8-2.

Thereby, the power flows from power storage device 6-1 via converter 8-1, main positive bus line MPL and main negative bus line MNL, and converter 8-2 to power storage device 6-2 so that the temperature of power storage devices 6-1 and 6-2 are increased. Since converter 8-1 controls voltage value Vh to attain target voltage VR1, the temperature of power storage devices 6-1 and 6-2 can be increased while controlling voltage value Vh to fall within an appropriate range.

According to the first embodiment of the invention, as described above, converter 8-1 is arranged between power storage device 6-1 and the pair of main positive bus line MPL and main negative bus line MNL, and converter 8-2 is arranged between power storage device 6-2 and the pair of main positive bus line MPL and main negative bus line MNL. During the temperature increase control, converter ECU 2 controls converter 8-1 or 8-2 that corresponds to the power storage device on the discharge side by the voltage FB control, and controls the converter corresponding to the power storage device on the charge side by the voltage FF control. Therefore, the power can be transferred between power storage devices 6-1 and 6-2 via converters 8-1 and 8-2 as well as main positive bus line MPL and main negative bus line MNL while preventing the interference between voltage control units 50-1 and 50-2 controlling respective converters 8-1 and 8-2.

According to the first embodiment of the invention, therefore, the temperature of power storage devices 6-1 and 6-2 can be rapidly increased. Consequently, a desired drive performance can be ensured even at the start of driving of vehicle 100.

During the temperature increase control, voltage value Vh between main positive bus line MPL and main negative bus line MNL is controlled to attain the target voltage so that the application of over-voltage to main positive bus line MPL and main negative bus line MNL can be prevented. Consequently, various devices connected to main positive bus line MPL and main negative bus line MNL can be protected from destruction due to the over-voltage.

Further, each of voltage control units 50-1 and 50-2 is provided with switching unit 55-1 or 55-2 that can selectively active and deactivate the voltage FB control function depending on whether the corresponding power storage device is on the discharge side or the charge side. Therefore, the switching of each of power storage devices 6-1 and 6-2 between the charge and discharge can be easily performed during the temperature increase control.

Modification of the First Embodiment

In the first embodiment, switching of the transistor takes place even in the converter corresponding to the power storage device on the charge side so that the switching loss occurs therein. Accordingly, a modification is configured to turn on an upper arm of the converter corresponding to the power storage device on the charge side, and thereby to reduce a loss during the temperature increase control.

Figure 8:
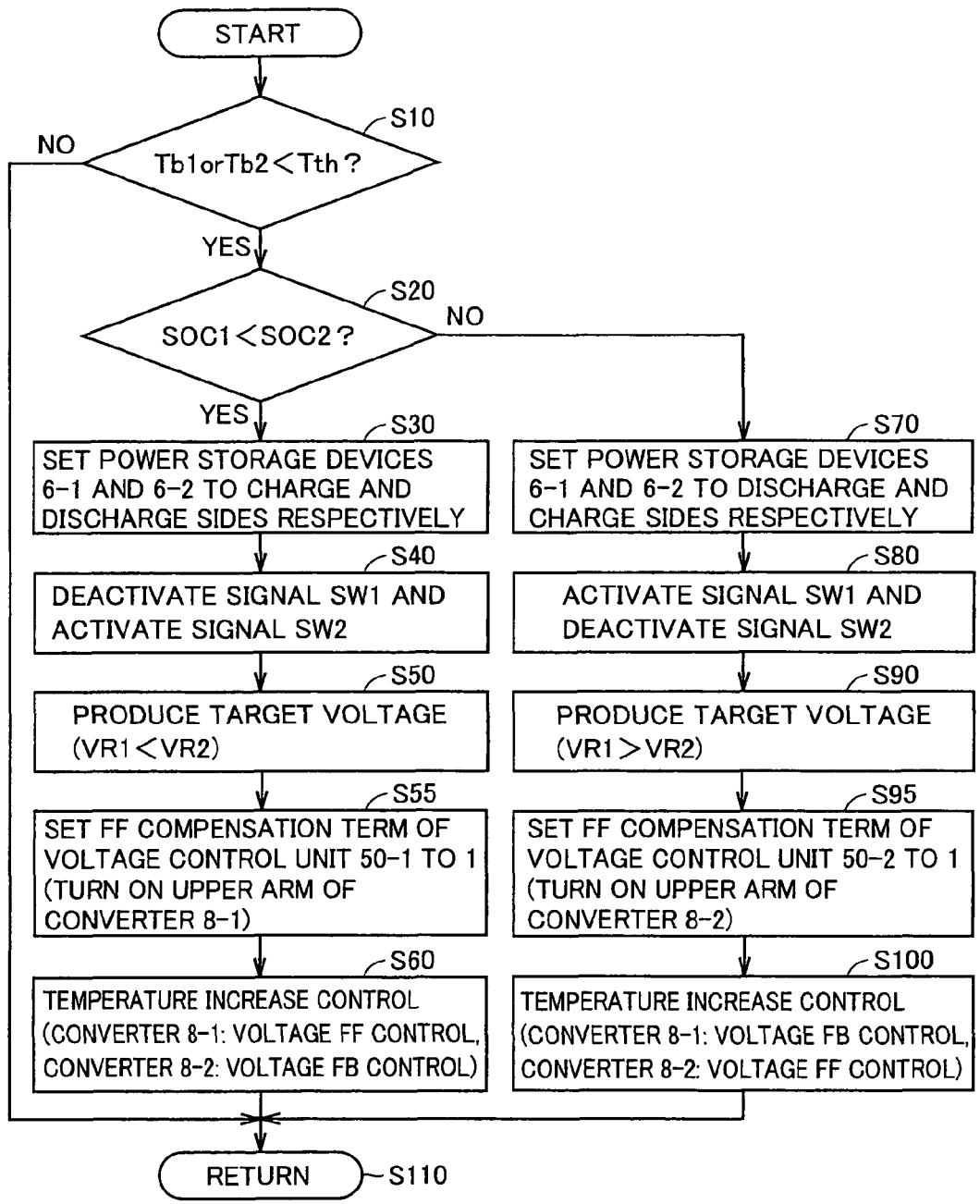
FIG. 8 is a flowchart of temperature increase control in a modification of the first embodiment.

FIG. 8 is a flowchart of the temperature increase control in the modification of the first embodiment. Referring to FIG. 8, this flowchart includes steps S55 and S95 in addition to those in the flowchart of FIG. 5. More specifically, when target voltages VR1 and VR2 are produced in step S50, switching control unit 70 sets the voltage FF compensation term (input term in subtraction unit 56-1) in voltage control unit 50-1 on the charge side to one (step S55). In voltage control unit 50-1, switching unit 55-1 has deactivated the voltage FB function to be implemented by PI control unit 54-1, and therefore duty instruction Ton1 is "1". Thereby, transistor Q1B corresponding the upper arm of converter 8-1 is on.

When target voltages VR1 and VR2 are produced in step S80, switching control unit 70 sets the voltage FF compensation term (input term in subtraction unit 56-2) in voltage control unit 50-2 on the charge side to one (step S95). In voltage control unit 50-2, switching unit 55-2 has deactivated the voltage FB function to be implemented by PI control unit 54-2, and therefore a duty instruction Ton2 is "1". Thereby, a transistor Q2B corresponding the upper arm of converter 8-2 is on.

According to the modification of the first embodiment of the invention, as described above, since the upper arm of the converter corresponding to the power storage device on the charge side is turned on, the switching loss of the converter is reduced. Therefore, the modification of the first embodiment of the invention can improve the efficiency of the temperature increase control.

Second Embodiment

In the first embodiment, both converters 8-1 and 8-2 are controlled by the voltage control during the temperature increase control. In a second embodiment, however, one of converters 8-1 and 8-2 is controlled by the voltage control, and the other is controlled by the current control.

Overall structures of a vehicle and a converter ECU in the second embodiment are the same as those of vehicle 100 and converter ECU 2 in the first embodiment that are shown in FIGS. 1 and 3, respectively.

Figure 9:
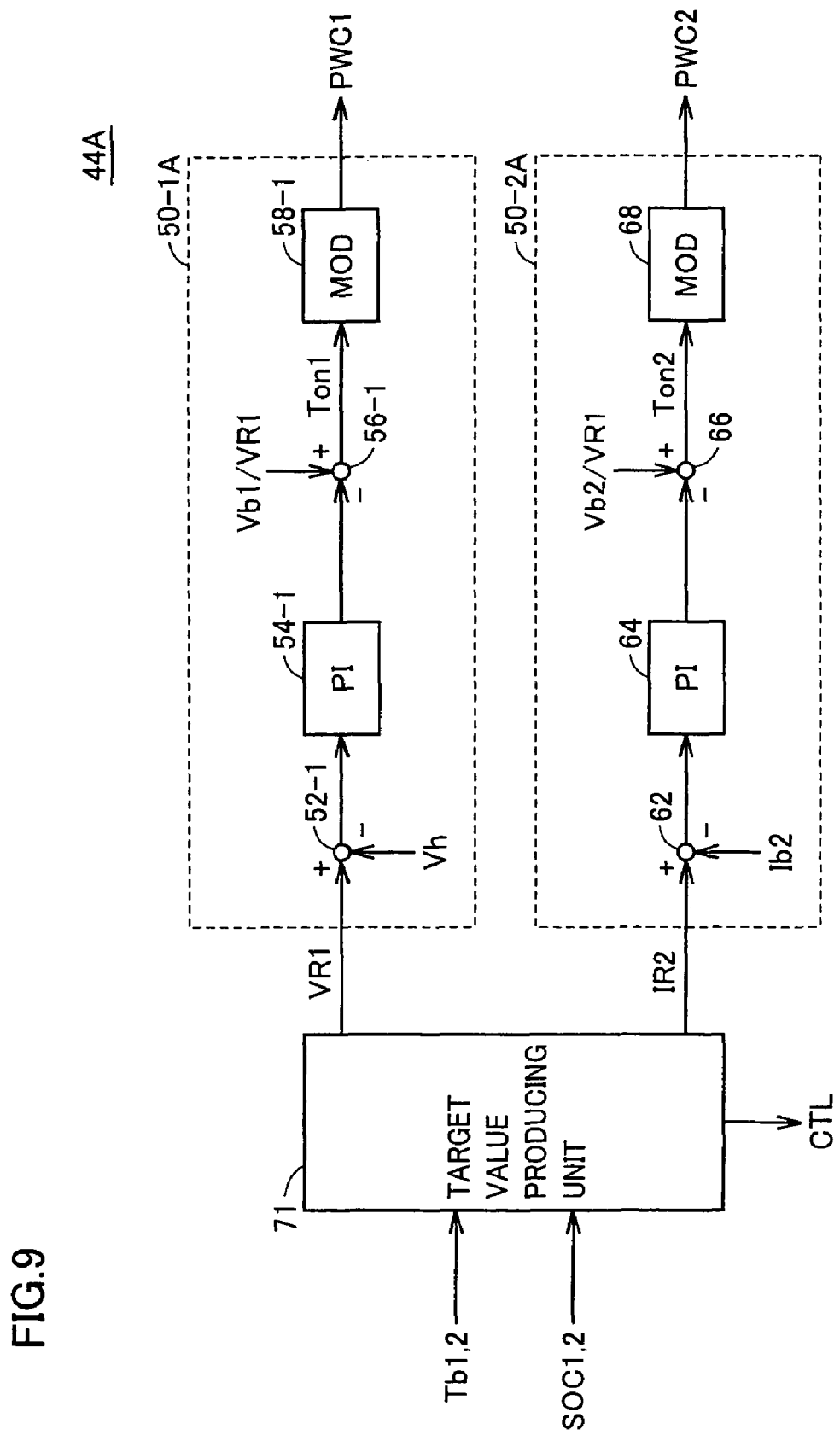
FIG. 9 is a functional block diagram specifically showing a temperature increase control unit in a second embodiment.

FIG. 9 is a functional block diagram specifically showing a temperature increase control unit in the second embodiment. Referring to FIG. 9, a temperature increase control unit 44A includes a voltage control unit 50-1A, a current control unit 50-2A, and a target value producing unit 71.

Voltage control unit 50-1A has the same structure as voltage control unit 50-1 shown in FIG. 4 except for that it does not include switching unit 55-1. Other structure thereof is the same as that of voltage control unit 50-1.

Current control unit 50-2A includes subtraction units 62 and 66, a PI control unit 64 and a modulation unit 68. Subtraction unit 62 subtracts a current value Ib2 from a target current IR2 provided from target value producing unit 71, and provides a result of this operation to PI control unit 64. PI control unit 64 performs a proportional-plus-integral operation using, as an input, a deviation between target current IR2 and current value Ib2, and provides a result of the operation to subtraction unit 66.

Subtraction unit 66 subtracts the output of PI control unit 64 from an inverse number of a theoretical boost ratio of converter 8-2 represented as (voltage value Vb2)/(target voltage VR1), and provides a result of the operation to modulation unit 68 as duty instruction Ton2. Modulation unit 68 produces drive signal PWC2 based on duty instruction Ton2 and a carrier wave produced by an oscillation unit (not shown), and provides drive signal PWC2 thus produced to transistors Q2A and Q2B of converter 8-2.

Target value producing unit 71 determines, based on temperatures Tb1 and Tb2, whether the temperature increase control of power storage devices 6-1 and 6-2 is to be executed or not, and activates control signal CTL to be provided to control unit 42 operating during running shown in FIG. 3 when the temperature increase control is to be executed. In the temperature increase control, target value producing unit 71 produces target voltage VR1 of converter 8-1 and target current IR2 of converter 8-2 based on temperatures Tb1 and Tb2 and state quantities SOC1 and SOC2, respectively, and provides target voltage VR1 and target current IR2 thus produced to voltage control unit 50-1A and current control unit 50-2A, respectively.

Figure 10:
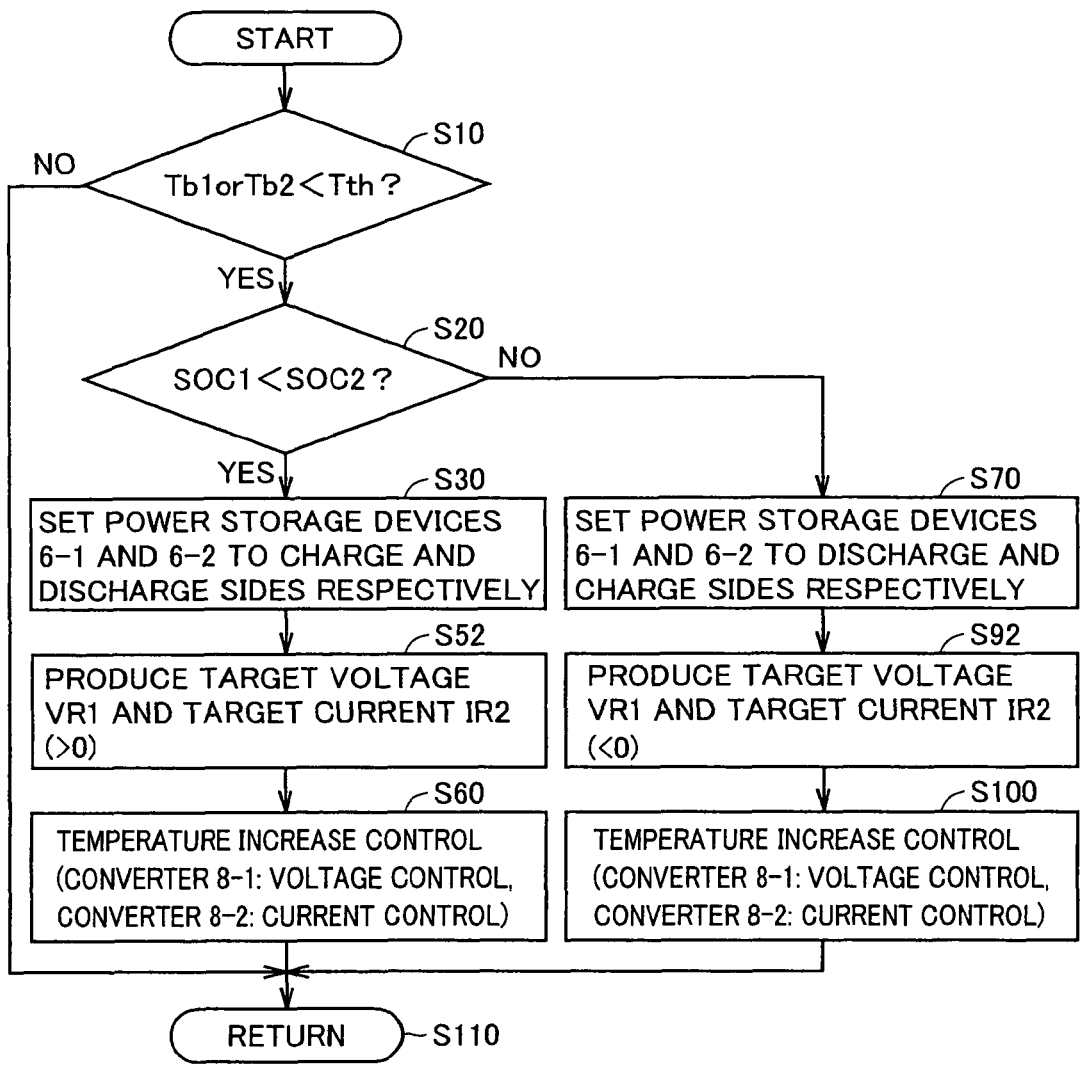
FIG. 10 is a flowchart of the temperature increase control by the temperature increase control unit shown in FIG. 9.

FIG. 10 is a flowchart of the temperature increase control by temperature increase control unit 44A shown in FIG. 9. The processing shown in this flowchart is called for execution from a main routine at predetermined time intervals or when predetermined conditions are satisfied (e.g., at the start of the system).

Referring to FIGS. 9 and 10, this flowchart does not include steps S40 and S80 in the flowchart shown in FIG. 5, and includes steps S52 and S92 in place of steps S50 and S90. More specifically, when power storage devices 6-1 and 6-2 are set on the charge side and the discharge side in step S30, respectively, target value producing unit 71 produces target voltage VR1 of converter 8-1 and target current IR2 of converter 8-2 (step S52).

Target value producing unit 71 produces target current IR2 that takes a positive value (the discharge direction). Positive target current IR2 may take a preset value, and may also take a value obtained by dividing, by voltage value Vb2, the allowed discharge power of power storage device 6-2 that is arithmetically obtained based on state quantity SOC2 of power storage device 6-2.

When power storage devices 6-1 and 6-2 are set on the discharge side and the charge side in step S70, respectively, target value producing unit 71 produces target voltage VR1 and target current IR2 (step S92). In this operation, target value producing unit 71 produces target current IR2 that takes a negative value (charge direction). Negative target current IR2 may be a preset value, and may also take a value obtained by dividing, by voltage value Vb2, the allowed charge power (of negative value) of power storage device 6-2 that is arithmetically obtained based on state quantity SOC2 of power storage device 6-2.

In temperature increase control unit 44A that is performing the temperature increase control, as described above, voltage control unit 50-1A controls converter 8-1 by the voltage control so that voltage value Vh may become target voltage VR1, and current control unit 50-2A controls converter 8-2 by the current control so that current value Ib2 may become target current IR2. Therefore, the temperature increase control can be implemented while controlling voltage value Vh between main positive bus line MPL and main negative bus line MNL to attain target voltage VR1, and controlling the current flowing between power storage devices 6-1 and 6-2 to attain target current IR2.

Figure 11:
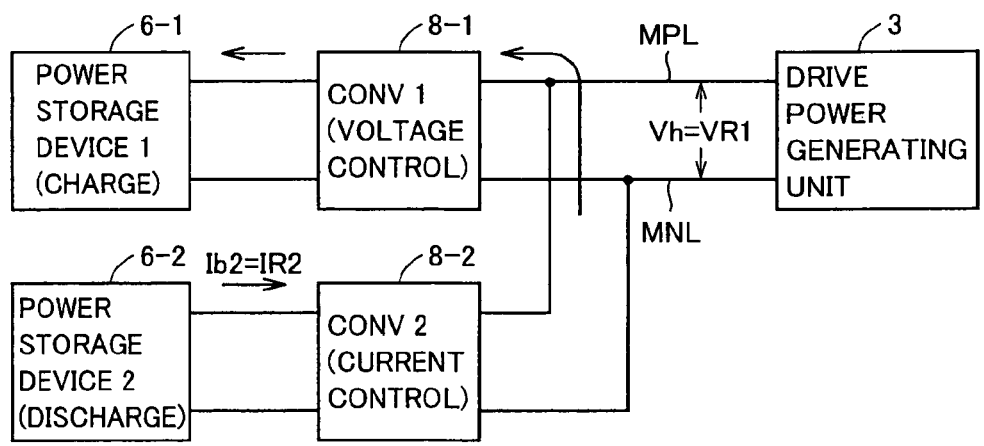
FIG. 11 is a first diagram showing a flow of an electric power during temperature increase control in the second embodiment.

FIG. 11 is a first diagram showing a flow of the electric power in the temperature increase control operation of the second embodiment. FIG. 11 shows a flow of the electric power in the state where power storage devices 6-1 and 6-2 are on the charge and discharge sides, respectively.

Referring to FIG. 11, converter 8-1 corresponding to power storage device 6-1 on the charge side is controlled by the voltage control, and converter 8-2 corresponding to power storage device 6-2 on the discharge side is controlled by the current control. Converter 8-2 supplies a current corresponding to target current IR2 from power storage device 6-2 to main positive bus line MPL and main negative bus line MNL. The supply of the current from converter 8-2 tends to raise the voltage between main positive bus line MPL and main negative bus line MNL, and converter 8-1 controls voltage value Vh between main positive bus line MPL and main negative bus line MNL to attain target voltage VR1. Thus, converter 8-1 passes the current from main positive bus line MPL and main negative bus line MNL to power storage device 6-1, and thereby controls the voltage between main positive bus line MPL and main negative bus line MNL to attain target voltage VR1.

As described above, the current flows from power storage device 6-2 via converter 8-2, main positive bus line MPL and main negative bus line MNL, and converter 8-1 to power storage device 6-1. Thus, the charge and discharge are performed on power storage devices 6-1 and 6-2 to heat power storage devices 6-1 and 6-2, respectively.

Figure 12:
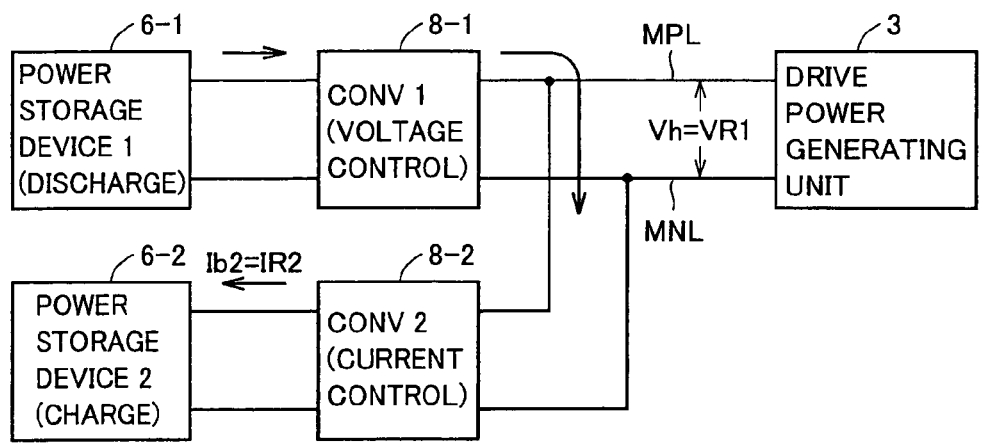
FIG. 12 is a second diagram showing the flow of the electric power during the temperature increase control in the second embodiment.

FIG. 12 is a second diagram showing the flow of the electric power during the temperature increase control in the second embodiment. FIG. 12 shows the current flow in the state where power storage devices 6-1 and 6-2 are on the discharge and charge sides, respectively.

Referring to FIG. 12, converter 8-2 passes the current corresponding to target current IR2 from main positive bus line MPL and main negative bus line MNL to power storage device 6-2. The operation of converter 8-2 tends to lower the voltage between main positive bus line MPL and main negative bus line MNL, and converter 8-1 controls voltage value Vh between main positive bus line MPL and main negative bus line L to attain target voltage VR1. Thus, converter 8-1 passes the current from power storage device 6-1 to main positive bus line MPL and main negative bus line MNL, and thereby controls the voltage between main positive bus line MPL and main negative bus line MNL to attain target voltage VR1.

As described above, the current flows from power storage device 6-1 to power storage device 6-2 via converter 8-1, main positive bus line MPL and main negative bus line MNL, and converter 8-2. Thus, the discharge and charge take place in power storage devices 6-1 and 6-2 to raise the temperatures of power storage devices 6-1 and 6-2, respectively.

It has been described that converters 8-1 and 8-2 are controlled by the voltage control and the current control, respectively. However, converters 8-1 and 8-2 may be controlled by the current control and the voltage control, respectively.

In the temperature increase control operation according to the second embodiment, as described above, one of converters 8-1 and 8-2 is controlled by the voltage control, and the other is controlled by the current control. Therefore, the second embodiment can implement the temperature increase control while controlling voltage value Vh between main positive bus line MPL and main negative bus line MNL to attain target voltage VR1, and controlling the current passed between power storage devices 6-1 and 6-2 to attain target current IR2.

Modification of the Second Embodiment

In the second embodiment, even when power storage device 6-1 is on the charge side, converter 8-1 causes switching of the transistor so that a switching loss occurs. In a modification, therefore, when power storage device 6-1 is on the charge side, an upper arm of converter 8-1 is turned on for reducing a loss during the temperature increase control.

Figure 13:
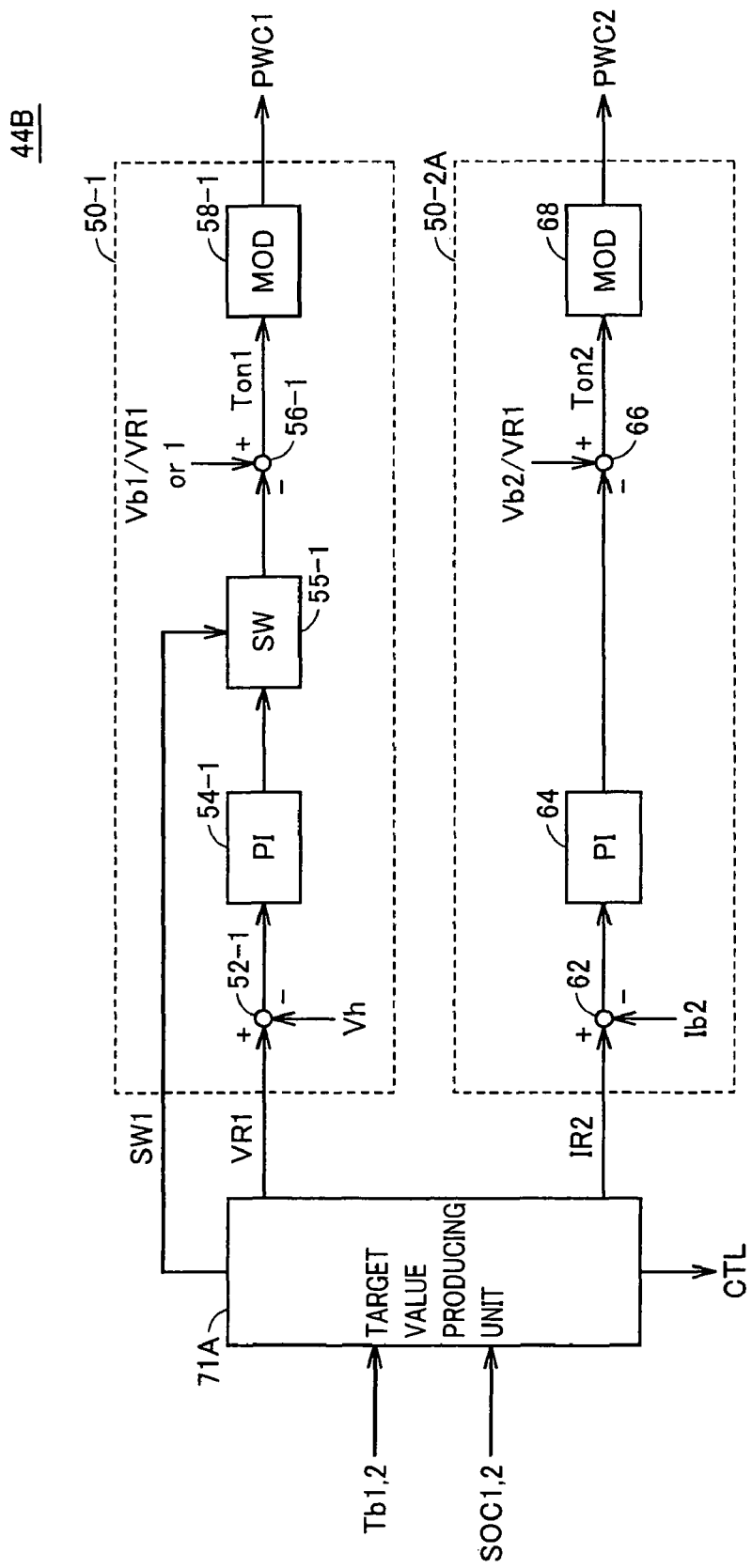
FIG. 13 is a functional block diagram specifically showing a temperature increase control unit in a modification of the second embodiment.

FIG. 13 is a functional block diagram specifically showing a temperature increase control unit in a modification of the second embodiment. Referring to FIG. 13, a temperature increase control unit 44B includes voltage control unit 50-1, current control unit 50-2A and a target value producing unit 71A.

During the temperature increase control operation, target value producing unit 71A produces target voltage VR1, target current IR2 and switching signal SW1 based on temperatures Tb1 and Tb2 as well as state quantities SOC1 and SOC2, provides target voltage VR1 and switching signal SW1 to voltage control unit 50-1, and provides target current IR2 to current control unit 50-2A.

Functions of target value producing unit 71A other than the above are the same as those of target value producing unit 71 shown in FIG. 9. The structure of voltage control unit 50-1 and that of current control unit 50-2A are already discussed with reference to FIGS. 4 and 9, respectively. Therefore, description thereof is not repeated.

Figure 14:
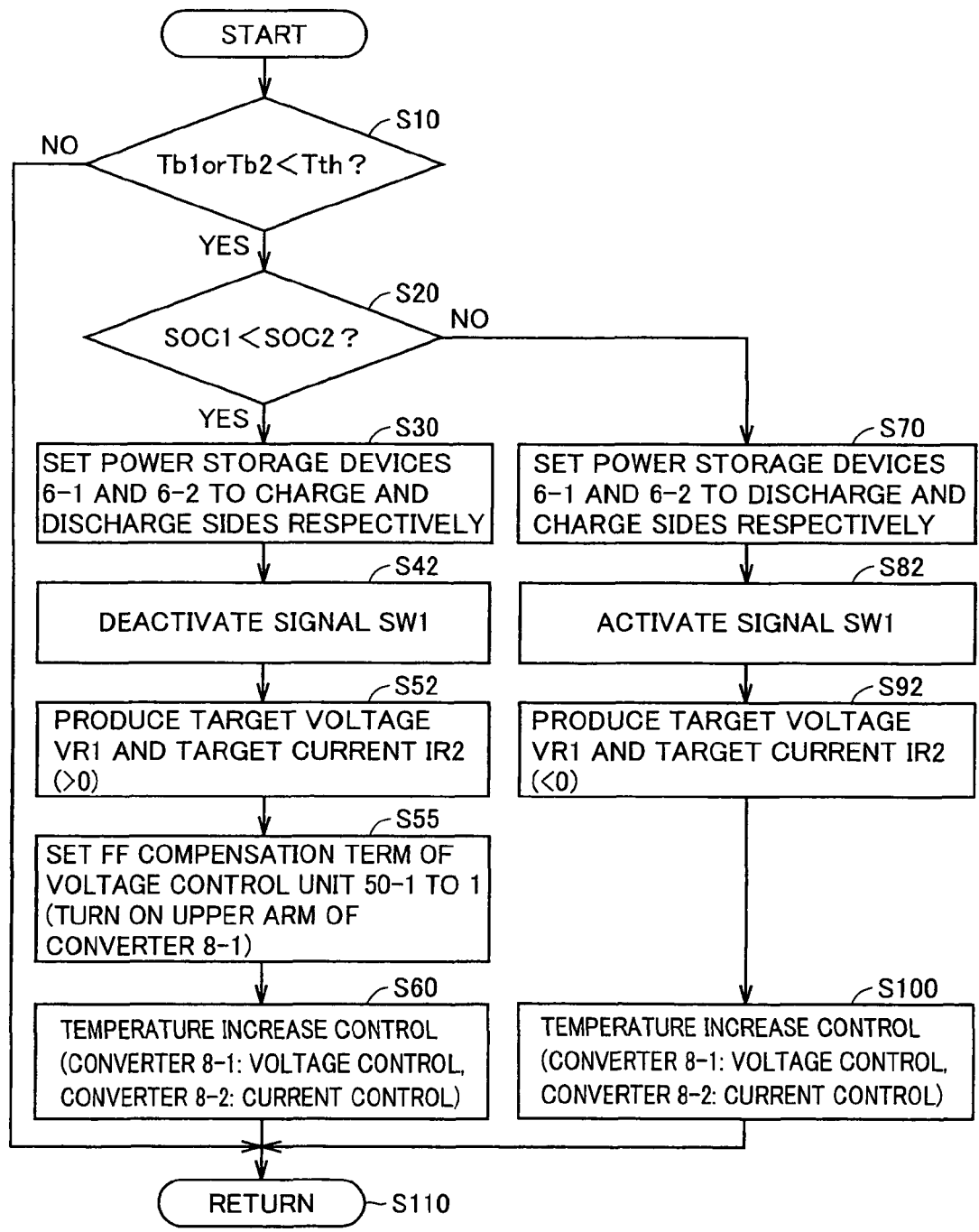
FIG. 14 is a flowchart of temperature increase control by the temperature increase control unit shown in FIG. 13.

FIG. 14 is a flowchart of the temperature increase control by temperature increase control unit 44B shown in FIG. 13. Referring to FIGS. 13 and 14, the flowchart includes steps S42, S55 and S82 in addition to those in the flowchart of FIG. 10. More specifically, when power storage devices 6-1 and 6-2 are set on the charge side and the discharge side in step S30, respectively, target value producing unit 71A deactivates switching signal SW1 to be provided to switching unit 55-1 of voltage control unit 50-1 (step S42).

When target voltage VR1 and target current IR2 are produced in step S52, target value producing unit 71A advances the processing to step S55. More specifically, target value producing unit 71A sets a voltage FF compensation term (input term in subtraction unit 56-1) in voltage control unit 50-1 to one. In voltage control unit 50-1, switching unit 55-1 has deactivated the voltage FB function to be implemented by PI control unit 54-1, and therefore duty instruction Ton1 is "1". Thereby, transistor Q1B corresponding the upper arm of converter 8-1 is on.

When power storage devices 6-1 and 6-2 are set on the discharge side and the charge side in step S70, respectively, target value producing unit 71A activates switching signal SW1 (step S82). Target value producing unit 71A advances the processing to step S92, and produces target voltage VR1 and target current IR2.

When the upper arm of converter 8-1 is always on in the case where power storage device 6-1 is on the discharge side, there is a possibility that converter 8-2 cannot pass the current to power storage device 6-2 from main positive bus line MPL and main negative bus line MNL that are cramped to the voltage of power storage device 6-1. In the case where power storage device 6-1 is on the discharge side, therefore, the upper arm of converter 8-1 is not always on, and converter 8-1 undergoes the voltage control according to target voltage VR1.

According to the modification of the second embodiment, as described above, the upper arm of the converter that undergoes the voltage control is turned on in the case where the corresponding power storage device is on the charge side. Therefore, the switching loss of the converter is reduced. Accordingly, the modification of this second embodiment can improve the efficiency of the temperature increase control.

In each of the embodiments already described, the temperature increase control unit shown in FIGS. 4, 9 and 13 may be formed of a circuit having functions corresponding to the respective blocks, or may be implemented by processing that is executed by converter ECU 2 according to preset programs. In the latter case, the control of temperature increase control units 44, 44A and 44B already described is performed by a CPU (Central Processing Unit). The CPU reads from a ROM (Read Only Memory) the program for executing the processing represented in the foregoing function blocks and the flowcharts, and executes the read program to execute the processing according to the foregoing function blocks and the flowcharts. Therefore, the ROM corresponds to a computer-readable (CPU-readable) recording medium that bears the programs for executing the processing indicated by the foregoing function blocks and the flowcharts.

In the first embodiment and the modification thereof already described, the converter corresponding to the power storage device on the charge side is controlled by the voltage FF control, and the converter corresponding to the power storage device on the discharge side is controlled by the voltage FB control. Conversely, the converter corresponding to the power storage device on the charge side may be controlled by the voltage FB control, and the converter corresponding to the power storage device on the discharge side may be controlled by the voltage FF control.

In the above description, the charge and discharge sides of the power storage devices are determined merely by setting the power storage device of a lower SOC on the charge side (and thus setting the power storage device of a higher SOC on the discharge side). In practice, however, it is preferable to set them as follows. In step S20, when power storage device 6-1 is on the charge side, power storage devices 6-1 and 6-2 will be set on the charge and discharge sides, respectively, until state quantity SOC1 rises to a state quantity of (SOC2+α). When power storage device 6-1 is on the discharge side in step S20, power storage devices 6-1 and 6-2 will be set on the discharge and charge sides, respectively, until state quantity SOC1 lowers to a state quantity of (SOC2−α).

In the above description, power supply system 1 includes converters 8-1 and 8-2 that correspond to two power storage devices 6-1 and 6-2, respectively. However, the system may includes three or more power storage devices and converters corresponding to them, in which case the temperature increase control can be implemented in the foregoing manner by arbitrarily selecting two power storage devices and corresponding converters.

In the description already made, main positive bus line MPL and main negative bus line MNL correspond to a "power line" in the invention, and converter ECU 2 corresponds to a "control device" in the invention. Voltage control units 50-1 and 50-2 correspond to a "first control unit" and a "second control unit" in the invention, respectively. Further, voltage sensor 18 corresponds to a "first voltage sensor", and voltage sensors 12-1 and 12-2 correspond to a "second voltage sensor" and a "third voltage sensor" in the invention, respectively. Inverters 30-1 and 30-2 as well as motor generators 34-1 and 34-2 form a "drive power generating unit" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply system capable of supplying an electric power to a load device, the power supply system comprising:
first and second power storage devices allowing charging and discharging;
a power line configured to be capable of supplying and receiving an electric power between the power supply system and said load device;
a first converter arranged between said first power storage device and said power line, and performing voltage conversion between said first power storage device and said power line;
a second converter arranged between said second power storage device and said power line, and performing voltage conversion between said second power storage device and said power line;
a control device controlling said first and second converters;
a first voltage sensor sensing a voltage on said power line; and
a temperature increase control unit configured to increase a temperature of at least one of said first and second power storage devices by controlling the supplying and receiving of an electric power between said first and second power storage devices via said first and second converters and said power line, wherein
said control device controls one of said first and second converters based on a result of an operation in voltage feedback control of said one converter using a deviation between a target voltage on said power line and a voltage sensed by said first voltage sensor, and controls the other converter based on a result of an operation in a voltage feedforward control of said other converter not using said deviation.

2. The power supply system according to claim 1, wherein said control device comprises:
first and second control units controlling said first and second converters, respectively, and
a switching control unit producing a switching instruction allowing switching between said operation in voltage feedback control and said operation in voltage feedforward control, and providing said switching instruction to each of said first and second control units, during an increase of temperature by said temperature increase control unit, wherein
each of said first and second control units includes
a voltage feedback compensation unit configured to be capable of performing the voltage feedback control of the corresponding converter,
a voltage feedforward compensation unit configured to be capable of performing the voltage feedforward control of said corresponding converter, and
a switching unit configured to be capable of selectively activating and deactivating a function of said voltage feedback compensation unit according to said switching instruction, and
said switching control unit produces, during said increase of temperature by said temperature increase control unit, said switching instruction to activate the function of the voltage feedback compensation unit of one of said first and second control units, and to deactivate the function of the voltage feedback compensation unit of the other control unit.

3. The power supply system according to claim 2, further comprising:
second and third voltage sensors sensing the voltages of said first and second power storage devices, respectively, wherein
said voltage feedforward compensation unit uses, as a compensation amount, a ratio between the voltage of the corresponding power storage device sensed by said second or third voltage sensor and the target voltage of said power line.

4. The power supply system according to claim 1, wherein said control device operates, during an increase of temperature by said temperature increase control unit, to control the converter corresponding to the power storage device on the discharge side based on a result of the operation in voltage feedback control, and to control the converter corresponding to the power storage device on the charge side based on a result of the operation in voltage feedforward control.

5. The power supply system according to claim 4, wherein each of said first and second converters includes a two-quadrant chopper circuit, and said control device controls, during said increase of temperature by said temperature increase control unit, the converter corresponding to the power storage device on the charge side to turn on a switching element forming an upper arm of said converter corresponding to the power storage device on the charge side.

6. A vehicle comprising:
the power supply system according to claim 1; and
a drive power generating unit receiving an electric power from said power supply system and generating a drive power of the vehicle.

7. A temperature increase control method for a power storage device in a power supply system capable of supplying an electric power to a load device, said power supply system including
first and second power storage devices allowing charging and discharging;
a power line configured to allow supply and reception of an electric power between said power supply system and said load device;
a first converter arranged between said first power storage device and said power line, and performing voltage conversion between said first power storage device and said power line;
a second converter arranged between said second power storage device and said power line, and performing voltage conversion between said second power storage device and said power line; and
a voltage sensor sensing a voltage on said power line, the method comprising:
a first step of controlling one of said first and second converters based on a result of an operation in voltage feedback control of said one converter using a deviation between a target voltage on said power line and a voltage sensed by said voltage sensor,
during a temperature increase control operation performed by a temperature increase control unit that increases a temperature of at least one of said first and second power storage devices by supplying and receiving an electric power between said first and second power storage devices via said first and second converters and said power line; and
a second step of controlling the other converter based on a result of an operation in a voltage feedforward control of said other convertor not using said deviation.

8. A computer-readable recording medium storing a program for causing a computer to execute temperature increase control of a power storage device in a power supply system capable of supplying an electric power to a load device, said power supply system including
first and second power storage devices allowing charging and discharging;
a power line configured to be capable of supplying and receiving an electric power between said power supply system and said load device;
a first converter arranged between said first power storage device and said power line, and performing voltage conversion between said first power storage device and said power line;
a second converter arranged between said second power storage device and said power line, and performing voltage conversion between said second power storage device and said power line; and
a voltage sensor sensing a voltage on said power line, wherein
said recording medium stores the program for causing the computer to execute:
a first step of controlling one of said first and second converters based on a result of an operation in voltage feedback control of said one converter using a deviation between a target voltage on said power line and a voltage sensed by said voltage sensor during a temperature increase control operation performed by a temperature increase control unit that increases a temperature of at least one of said first and second power storage devices by supplying and receiving an electric power between said first and second power storage devices via said first and second converters and said power line; and
a second step of controlling the other converter based on a result of an operation in a voltage feedforward control of said other converter not using said deviation.

* * * * *